(12) United States Patent
Kotenkoff et al.

(10) Patent No.: US 10,234,252 B2
(45) Date of Patent: Mar. 19, 2019

(54) TARGET MARKING DEVICE AND TARGET PROCESSING SYSTEM COMPRISING SUCH A TARGET MARKING DEVICE

(71) Applicant: MBDA FRANCE, Le Plessis-Robinson (FR)

(72) Inventors: Alexandre Kotenkoff, Fontenay-aux-Roses (FR); David Vigouroux, Le-Plessis-Robinson (FR); Antoine Vivares, Paris (FR); Olivier Hebert, Paris (FR); Arnaud Durantin, Le Bourget (FR)

(73) Assignee: MBDA FRANCE, Le Plessis-Robinson (FR)

( * ) Notice: Subject to any disclaimer, the term of this patent is extended or adjusted under 35 U.S.C. 154(b) by 0 days.

(21) Appl. No.: 15/112,526

(22) PCT Filed: Jan. 7, 2015

(86) PCT No.: PCT/FR2015/000005
§ 371 (c)(1),
(2) Date: Jul. 19, 2016

(87) PCT Pub. No.: WO2015/110727
PCT Pub. Date: Jul. 30, 2015

(65) Prior Publication Data
US 2016/0341531 A1 Nov. 24, 2016

(30) Foreign Application Priority Data
Jan. 22, 2014 (FR) ..................... 14 00120

(51) Int. Cl.
*F42B 12/36* (2006.01)
*G05D 1/12* (2006.01)
(Continued)

(52) U.S. Cl.
CPC .......... *F42B 12/365* (2013.01); *B64C 39/024* (2013.01); *B64C 39/028* (2013.01); *F41G 3/18* (2013.01); *F41G 7/226* (2013.01); *F41G 7/2286* (2013.01); *F41G 7/2293* (2013.01); *F41H 7/005* (2013.01); *F42B 12/40* (2013.01); *G05D 1/12* (2013.01); *B64C 2201/12* (2013.01); *B64C 2201/146* (2013.01)

(58) Field of Classification Search
CPC ...... G05D 1/0011; G05D 1/0038; G05D 1/12; G05D 1/0022; G05D 1/10; G05D 1/101;
(Continued)

(56) References Cited

U.S. PATENT DOCUMENTS 3,415,465 A * 12/1968 Bedford .................... F41G 7/30
3,469,260 A * 9/1969 Holt et al. ................ F41G 7/30
(Continued)

FOREIGN PATENT DOCUMENTS

EP 0148704 A2 * 7/1985 ........... F41G 7/2293
EP 2450862 A1 * 5/2012 ........... G05D 1/0022

OTHER PUBLICATIONS

International Search Report dated Mar. 27, 2015, issued in corresponding International Application No. PCT/FR2015/000005, filed Jan. 7, 2015, 2 pages.
(Continued)

*Primary Examiner* — Bernarr E Gregory
(74) *Attorney, Agent, or Firm* — Christensen O'Connor Johnson Kindness PLLC

(57) ABSTRACT

The target marking device comprises a small-size flying unit, said flying unit being configured to fly at low height and to be guided with the aid of guidance commands, said flying unit being furnished with at least one sensor able to measure at least one parameter of the environment, a data transmission unit configured to emit at least data relating to measurements carried out by the sensor from the flying unit and to receive guidance orders at the flying unit, and at least one emitter able to emit position information.

30 Claims, 3 Drawing Sheets

(51) Int. Cl.
*F41H 7/00* (2006.01)
*B64C 39/02* (2006.01)
*F42B 12/40* (2006.01)
*F41G 3/18* (2006.01)
*F41G 7/22* (2006.01)
*F41G 7/00* (2006.01)

(58) Field of Classification Search
CPC ........... G05D 1/107; F41H 7/005; F41G 3/14; F41G 3/18; F41G 7/20; F41G 7/22; F41G 7/226; F41G 7/2273; F41G 7/2286; F41G 7/2293; F41G 7/30; F41G 3/02; F41G 3/145; F41G 7/303; B64C 39/02; B64C 39/024; B64C 39/028; B64C 2201/12; B64C 2201/14; B64C 2201/146; F42B 12/02; F42B 12/36; F42B 12/365; F42B 12/40; F42B 12/56; F42B 12/70
See application file for complete search history.

(56) References Cited

U.S. PATENT DOCUMENTS

| | | | | |
|---|---|---|---|---|
| 3,557,304 A | * | 1/1971 | Rue et al. | G05D 1/0038 |
| 3,564,134 A | * | 2/1971 | Rue et al. | G05D 1/0038 |
| 3,778,007 A | * | 12/1973 | Kearney, II et al. | F41G 7/30 |
| 4,281,809 A | | 7/1981 | Oglesby et al. | |
| 4,354,419 A | * | 10/1982 | Patterson | F41G 7/30 |
| 4,867,034 A | | 9/1989 | Trosky et al. | |
| 6,119,976 A | * | 9/2000 | Rogers | B64C 2201/145 244/13 |
| 7,478,578 B2 | * | 1/2009 | Kirkpatrick | F42B 12/70 244/1 R |
| 7,962,252 B2 | * | 6/2011 | Shams | G05D 1/101 345/601 |
| 8,178,825 B2 | * | 5/2012 | Goossen et al. | F41G 7/303 |
| 8,610,776 B2 | * | 12/2013 | Larroque et al. | F41G 7/2293 |
| 2007/0069083 A1 | * | 3/2007 | Shams | G05D 1/101 244/195 |
| 2008/0190274 A1 | * | 8/2008 | Kirkpatrick | F42B 12/70 89/1.11 |
| 2010/0198514 A1 | | 8/2010 | Miralles | |
| 2010/0259614 A1 | | 10/2010 | Chen | |
| 2011/0084161 A1 | * | 4/2011 | Wallis | F41G 7/30 |

OTHER PUBLICATIONS

Written Opinion of the International Searching Authority dated Mar. 27, 2015, issued in corresponding International Application No. PCT/FR2015/000005, filed Jan. 7, 2015, 6 pages.

* cited by examiner

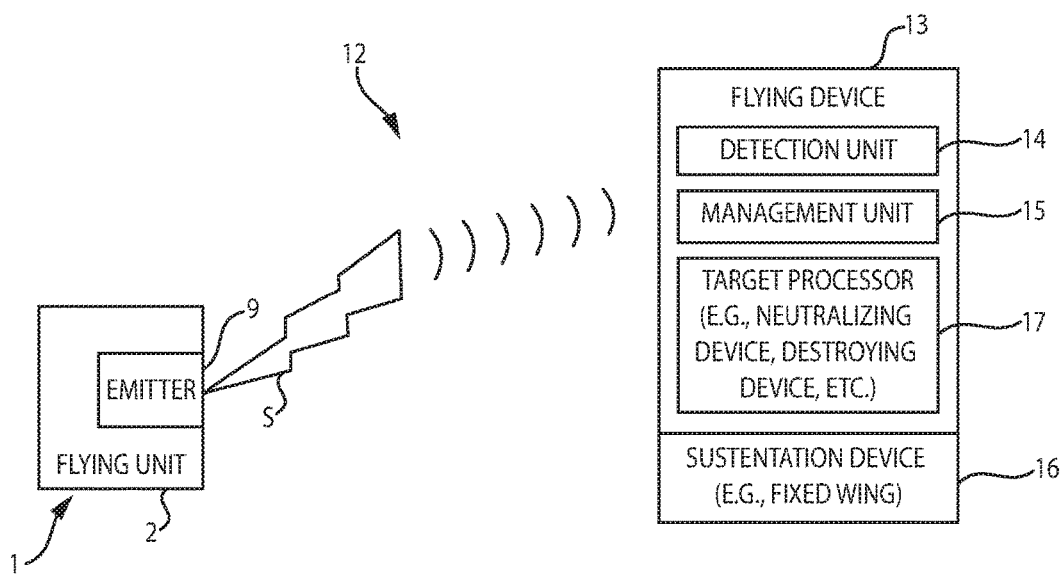
FIG. 2
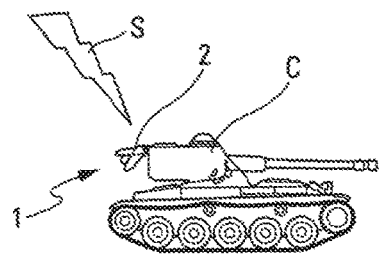
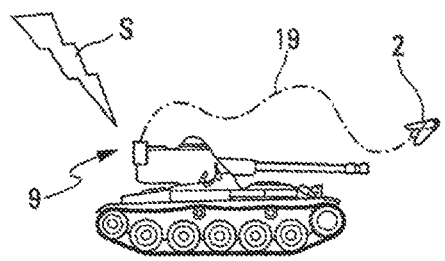
FIG. 3          FIG. 4

TARGET MARKING DEVICE AND TARGET PROCESSING SYSTEM COMPRISING SUCH A TARGET MARKING DEVICE

FIELD OF THE DISCLOSURE

Aspects of the present disclosure relate to a target marking device and a target processing system comprising such a target marking device.

In the framework of the present disclosure, the term "processing a target" means acting on this target, for example in order to neutralise it, destroy it, carry it away, etc.

Although not exclusively, embodiments of the disclosure apply more particularly to the military field and in particular to the neutralisation of a target, such as a tank for example, by the intermediary of at least one flying device such as a missile in particular.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A flying device comprises, generally, a set of onboard sensors that make it possible to recognise and analyse the target, as well as means for neutralising it. Although often very expensive, these sensors do not have, in general, a resolution that is sufficient for carrying out a precise acquisition of a target (or objective) when the flying device is moving at a very high speed, from a high altitude, or when the acquisition and the analysis of the target have to be carried out at a distance of several kilometers.

In addition, in the case of a flying device of the consumable type (i.e. a flying device that can no longer be used once its mission is fulfilled), it is not possible to collect information concerning the success of the mission and/or the consequences on the immediate environment of the target.

Usually, in order to assign a flying device to a target, there are several approaches:

A/ a first usual approach assumes that an operator is present in the vicinity of an objective zone where the target is located. This operator, thanks in particular to a laser pointer, must illuminate the target so that the flying device can identify it and be guided to the latter. The main disadvantages of this first approach are:
  a difficulty for the operator to access the objective zone;
  the loss of onboard sensors (in particular optoelectronics), when the flying device is of the consumable type; and
  problems with insufficient resolutions of a sensor, when the flying device and therefore the onboard sensor are still far from the target; and B/ a second usual approach assumes that an operator is in the decision loop, although the operator may be located at a substantial distance from the target. In this case, the operator receives, via a data transmission link, images coming from a sensor on board the flying device and it can generate commands in particular for guidance or activation according to the images received. The main disadvantages of this second approach are:
  the loss of onboard sensors (in particular optoelectronics), when the flying device is of the consumable type;
  problems with insufficient resolutions of a sensor, when the flying device and therefore the onboard sensor are still far from the target; and
  little reaction time left to the operator when the flying device is quickly approaching the target.

These usual solutions for target processing are therefore not entirely satisfactory.

Embodiments disclosed herein relate to a target marking device, which makes it possible to assist in overcoming this disadvantage.

To this effect, according to some embodiments, said target marking device is remarkable, in that is comprises at least:
  one small-size flying unit, said flying unit being configured to fly at low height and to be guided with the aid of guidance commands, said flying unit being provided with at least one sensor able to measure at least one parameter of the environment;
  one data transmission unit configured to emit at least data relating to measurements carried out by the sensor from the flying unit and to receive guidance orders at said flying unit; and
  at least one emitter mounted on the flying unit and able to emit position information.

More preferably, said flying unit flies at a height of less than fifty meters, and its size is less than that of a cube with sides of twenty centimeters.

As such, thanks to some embodiments of the disclosure, a target marking device is available provided with a flying unit that has a small size, which allows it to fly at low height without being detected, which allows it to approach the vicinity of a target and therefore be able to use sensors with a reduced cost, for example sensors (optical or infrared) with a reduced resolution.

In addition, thanks to the data transmission unit, which allows the flying unit to communicate with a remote station, an operator can receive data in particular on the environment of the flying unit and send to it guidance commands in order to guide it, remotely, which allows the operator to take shelter while still being in the control loop.

In a preferred embodiment, the flying unit is provided with at least one sensor able to generate an image of at least one portion of the environment of the flying unit, and the data transmission unit is configured to transmit said image to a display unit of said remote station.

Furthermore, in a particular embodiment, the flying unit is provided with at least one of the following sensors:
  a thermal sensor;
  a sensor able to generate an image (optical or infrared) of the environment;
  at least one sensor able to analyse one of the following parameters of the environment: a chemical parameter, mechanical parameter (vibrations, etc.), and an electromagnetic parameter.

Moreover, in a first embodiment, said emitter is fixed (or mounted in a fixed manner) on said flying unit. In addition, as an alternative or a supplement, the target marking device comprises an emitter that is mounted, in a removable manner, on the flying unit and is provided with at least one attachment element configured to make it possible to attach said emitter onto a support (other than the flying unit).

In a preferred embodiment, said emitter is configured to emit a directional guidance beam.

Furthermore, advantageously, said flying unit comprises at least one central unit configured to process data and at least data received from said sensor. In an alternative embodiment, said central unit is able to automatically determine guidance commands used to guide the flying unit.

Moreover, in a particular embodiment, said flying unit comprises a receiving unit configured to receive electromagnetic signals, and a data management unit configured to manage (or process) electromagnetic signals received by said receiving unit, which makes it possible to create a guidance chain from a plurality of such flying units, as mentioned hereinbelow.

Furthermore, in a particular embodiment, said flying unit is provided with means that can be activated able to generate an explosion, triggered automatically or remotely by an operator in particular, in order to destroy for example a target (in particular a mine) in the vicinity of which or on which the flying unit is located.

Some embodiment of the disclosure also relate to a target processing system. According to some embodiments, said target processing system comprises:
- at least one target marking device, such as the one mentioned hereinabove; and
- at least one autonomous flying device, said autonomous flying device comprising:
- means for detecting position information, emitted by the emitter of said target marking device;
- means for managing this position information for the purpose of guiding the flying device; and
- means for processing a target.

As such, thanks to the marking of the target carried out using the flying unit, it is not necessary for the flying device for target processing (or an operator) to emit signals, in particular a target designation beam, for the guidance of said flying device to the target to be processed. The flying device is as such very discreet. In addition, it is entirely autonomous.

In a particular embodiment, said target processing system comprises a plurality of target marking devices, said plurality of target marking devices being able to communicate between them in order to position themselves in space with respect to one another so as to create a guidance chain for at least one autonomous flying device.

Said target processing system in accordance with various embodiments can be implemented in different applications.

In particular, in a first application:
- said target marking device is a device for marking a target to be neutralised, for example a tank; and
- said autonomous flying device is a missile intended to neutralise (destroy) this target.

Furthermore, in a second application:
- said target marking device is a device for locating one or several people in distress; and
- said autonomous flying device is a rescue vehicle, preferable a rescue aircraft.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 2 is a block diagram of a target processing system;

FIGS. 3 and 4 show two different examples of emission of signals from a target;

DETAILED DESCRIPTION

Figure 1:
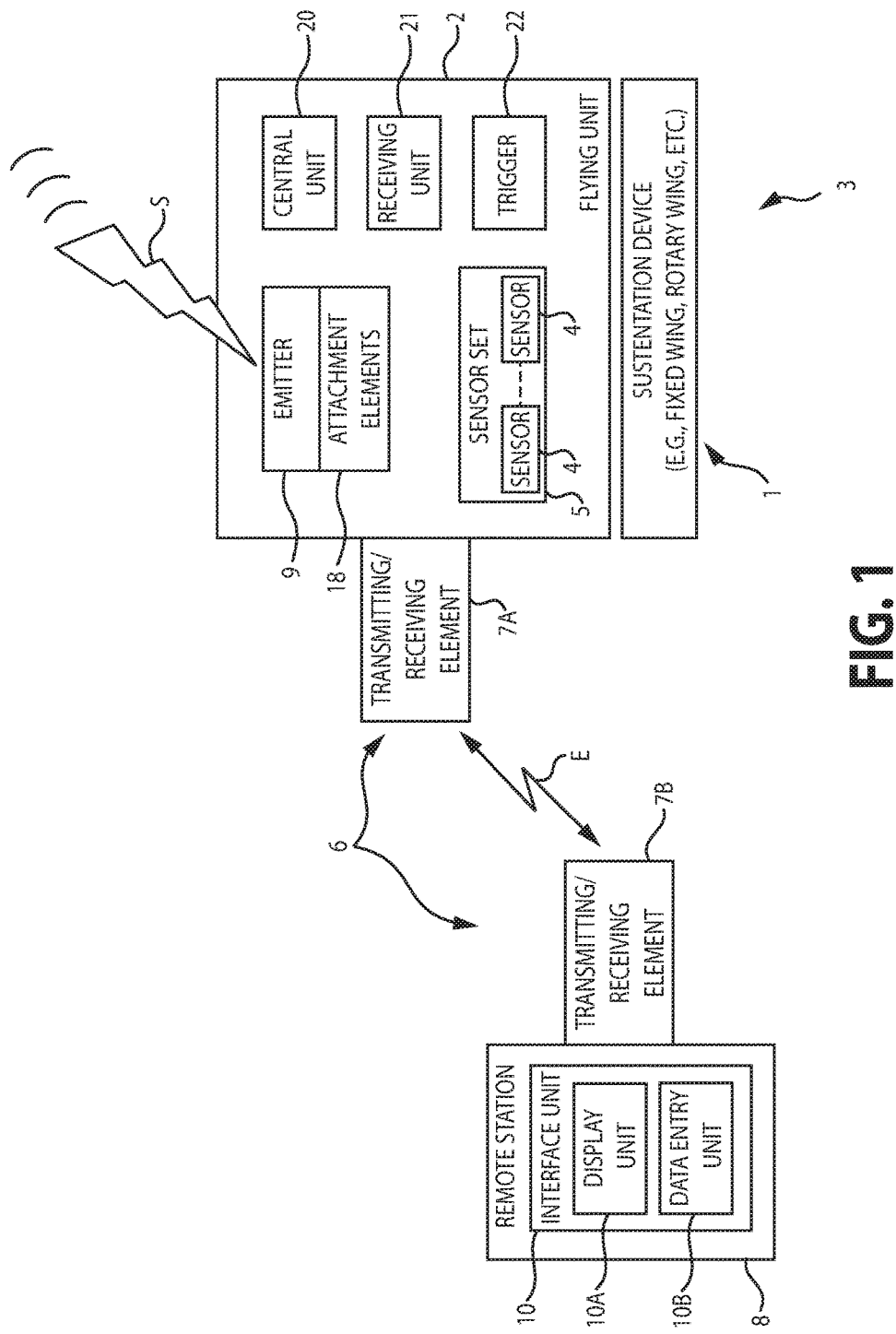
FIG. 1 is a block diagram of a target marking device that shows an embodiment.

The device 1 diagrammatically shown in FIG. 1 and which makes it possible to illustrate the invention, is intended to at least mark a target.

According to some embodiments, this target marking device 1 comprises:
- a small-size flying unit 2, very diagrammatically shown in FIG. 1. This flying unit 2 comprises usual means 3 (in particular means for sustentation (fixed wing, rotary wing, etc.) and for generating a force of forward movement)), which are shown diagrammatically and which are formed in such a way as to fly the flying unit 2. More particularly, as mentioned hereinbelow, the flying unit 2 is formed in such a way as to fly at low height, by being guided by guidance commands. Said flying unit 2 is provided with a set 5 of sensor(s), comprising at least one sensor 4 mentioned hereinbelow, which is able to measure at least one parameter of the environment;
- a data transmission unit 6 which comprises a transmitting/receiving element 7A. This transmitting/receiving element 7A is mounted on the flying unit 2 and is formed in such a way as to emit and to receive signals of the electromagnetic type (shown by a double arrow E in FIG. 1), in order to remotely transmit data (in particular data relating to measurements carried out by at least one sensor 4 of the set 5) from the flying unit 2 and to receive guidance commands at said flying unit 2. To do this, the data transmission unit 6 comprises, in addition, at least one other transmitting/receiving element 7B which is arranged for example on a remote station 8 in particular on the ground and which is able to exchange, usually, information with the transmitting/receiving element 7A mounted on the flying unit 2; and
- at least one emitter 9 mounted, in a fixed or mobile manner, on the flying unit 2 and able to emit position information, via an electromagnetic signal, mentioned hereinbelow and shown by a symbol S.

The flying unit 2 has, preferably, the following characteristics:
- a flight altitude between 0 and 50 meters;
- a size less than that of a cube with sides of twenty centimeters, i.e. of which: L<20 cm, w<20 cm, h<20 cm (with L: length; w: width; h: height); and
- an approach distance of the flying unit 2 with respect to an objective (target) which is located between 0 meters (or direct contact) and 10 meters according to the cases.

The target marking device 1 provided with the flying unit 2 which therefore has a small size allowing for flight at low height without being detected, is as such able to approach (discreetly) in the vicinity of a target C and therefore be able to use sensors 4 with a reduced cost, for example sensors (optical or infrared) with a reduced resolution.

In addition, thanks to the data transmission unit 6, which allows the flying unit 2 to communicate with a remote station 8, an operator (located at this station 8) can receive data, in particular data on the environment of the flying unit 2, and send it guidance commands in order to guide it remotely using an interface unit 10. This interface unit 10 comprises, for example, a display unit 10A provided with a screen and a data entry unit 10B such as a computer mouse, a touchpad or a voice recognition unit, allowing an operator to enter data, in particular data that is to be transmitted via the data transmission unit 6.

As such, the operator can take shelter while still being in the decision loop, in particular for controlling and for guiding the device 1. Indeed, in this case, the operator can receive, via a data transmission link E, in particular images coming from a sensor 4 on board the flying unit 2, which are displayed on the display unit 10A, and the operator can generate commands in particular for guidance or activation according to the images received as such. The command scan be transmitted to the flying unit 2 via the link E, either directly, or indirectly by the intermediary of relays (for example other flying units 2).

The miniaturisation of the flying unit 2 (for observation and for acquisition) allows it to more easily carry out at least some of the following functions, mentioned hereinafter:
- approaching a target C;
- observing a target C;
- marking a target C;
- guiding;
- transmitting information; and
- supplying a mission report.

For military applications in particular, miniaturisation is of course essential in terms of discretion.

In a preferred embodiment, the target marking device 1 is part of a target processing system 12.

The target processing system 12 comprises, as shown diagrammatically in FIG. 2, at least one target marking device 1 such as the one hereinabove, as well as at least one flying device 13. This flying device 13 is autonomous and comprises:
- a detection unit 14 able to receive position information, emitted by the emitter 9 of the target marking device 1, in the form of a signal S;
- a management unit 15 formed in such a way as to manage (or process) in particular this position information (transmitted in the form of a signal S) for the purposes of guiding the flying device 13;
- usual means 16 (in particular means for sustentation (wing, aileron, etc.) and means for generating a force of forward movement (reactor, rotary wing, etc.)), which are shown diagrammatically and which are formed in such a way as to fly the flying device 13; and
- means 17 for processing a target, namely usual means for, for example, destroying, neutralising or carrying away the target C.

As such, thanks to a marking of a target C carried out by the flying unit 2 using an emitter 9, it is not necessary for the flying device 13 for processing a target (or an operator) to emit signals, in particular a target designation beam, for the guidance of said flying device 13 to a target C to be processed. The flying device 13 is as such very discreet and has a low cost. In addition, it is entirely autonomous, as it uses only the signals S to guide itself to the target C.

In a particular embodiment, the flying unit 2 is provided with at least one of the following usual sensors 4 (or means of identification):
- a thermal sensor;
- a sensor able to generate an image (optical or infrared) of the environment;
- a sensor able to analyse a chemical parameter (analysis of the chemical signature: paint, explosives, exhaust gas, human odours, etc.);
- a sensor able to analyse an electromagnetic parameter; and
- a sensor of the mechanical type (sonar, vibration detector or seismic detector).

In a preferred embodiment, the flying unit 2 is provided with at least one sensor 4 able to generate an image of at least one portion of the environment of the flying unit 2, and the data transmission unit 6 is configured to transmit this image to the display unit 10A of the interface unit 10 located at the remote station 8, which allows a remote operator to see the environment of the flying unit 2 and in particular of a target C, and this both before and after the processing of the target C.

Moreover, the emission carried out by the emitter 9 (and shown by a signal S in the figures) can have the following characteristics:
- an emissions range of at least 200 meters;
- an emissions mode: directional or omnidirectional, with a relay possible for the constitution of communication chains. A communication chain makes it possible in particular to increase the emissions range;
- one of the following types of emission: laser, radio.

In a first embodiment, said emitter 9 is fixed (or mounted in a fixed manner) on said flying unit 2. In this case, in order to mark a target C, for example a tank, the flying unit 2 lands directly on the target C, as shown in FIG. 3. However, in this case, if the processing of the target C consists in a destruction of the latter, the flying unit 2 is also destroyed during this processing.

Alternatively or as a supplement, the target marking device 1 comprises an emitter 9 that is mounted in a removable manner on the flying unit 2. This emitter 9 is provided with at least one attachment element 18 configured to make it possible to attach said emitter 9 to a support (other than the flying unit 2) and in particular to a target C, as shown in FIG. 4.

In this latter embodiment, the flying unit 2 lands on the target C and releases the emitter 9 which is attached to the target C, using the attachment element 18. The flying unit 2 can then move away from the target C, as shown in FIG. 4 (by following a trajectory 19), in order to not be reached during a processing or a destruction of the target C and/or in order to carry out another mission. In particular, the flying unit 2 can comprise a plurality of emitters 9 that it can place successively on different targets. The attachment element 18 for attaching (or hooking) the emitter 9 to a target C can comprise at least one of the elements: a chemical adhesive, a magnet, a suction cup, a mechanical fastening, etc.

Furthermore, in a preferred embodiment, said emitter 9 is configured to emit a guidance beam S of the directional type, in particular to facilitate the guiding of a cooperating flying device 13.

Moreover, said flying unit 2 comprises at least one central unit 20 configured to process data, and at least data received from at least one sensor 4 of said set 5. In a particular embodiment, said central unit 20 is able to automatically determine guidance commands used by the means 3 for guiding the flying unit 2. The flying unit 2 can as such be guided automatically without intervention or with limited intervention from an operator.

Moreover, in a particular embodiment, said flying unit 2 also comprises a receiving unit 21 configured to receive electromagnetic signals. This receiving unit 21 can be able to receive signals:
- such as signals S emitted by an emitter 9 of another flying unit 2 or by an emitter 9 placed on a target C; or
- other signals emitted from a flying unit 2, for example such as those E emitted by a transmitting/receiving element 7A or 7B. In this latter case, the receiving unit 21 can be part of the data transmission unit 6.

Figure 5:
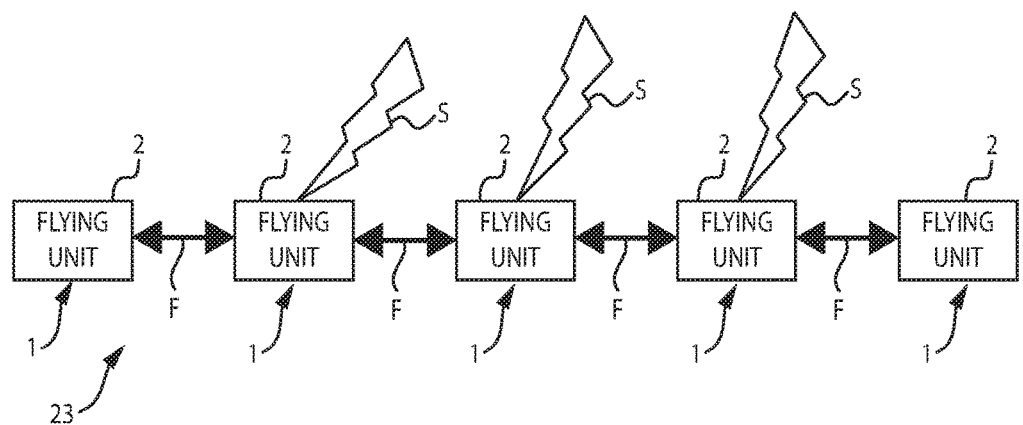
FIG. 5 diagrammatically shows a guidance chain comprising a plurality of target marking devices.

The receiving unit 21 can also be part of a data transmission unit, intended solely for communication between flying units 2, as shown by double arrows F in FIG. 5.

In a particular embodiment, the flying unit 2 comprises a data management unit, which is, for example, part of the central unit 20 and which is configured to manage (or process) electromagnetic signals received by said receiving unit 21, which makes it possible to create a guidance chain 2 from a plurality of such flying units 2 (FIG. 5), as mentioned hereinbelow.

Moreover, in a particular embodiment that makes it possible to destroy a target C such as a mine for example, said flying unit 2 is provided with means 22 that can be activated able to generate an explosion. This explosion, which therefore has for purpose to destroy a target C in the vicinity of which or on which the flying unit 2 is located, can be triggered:
 either automatically, for example according to measurements carried out by at least one sensor 4 of the set 5;
 or remotely by an operator, for example via the data transmission unit 6.

As indicated hereinabove, the target processing system 12 comprises, as shown in FIG. 2, at least one target marking device 1, such as the one hereinabove, and at least one autonomous flying device 13.

These embodiments therefore provides an assigning and reconnaissance function in a flying unit 2 controlled automatically or by an operator. This function is independent of the flying device 13 having the charge of delivering an item or of accomplishing a mission. In other terms, with the system 12 in accordance with some embodiments, the role of observing and of assigning on the one hand and the role of processing a target C on the other hand, are as such provided by two separate physical vectors.

The flying unit 2 can, in particular, carry out the following tasks:
 identification of the target C (as close as possible);
 reliable designation of the target C until terminal guidance; and
 depositing of a marker (emitter 9) on the target C, in a particular alternative with a removable marker.

The flying unit 2 transmits all of the information required to the flying device 13 (via signals S), so that the latter can carry out its mission. The flying device 13 of the autonomous type is guided blindly by the flying unit 2.

When the flying device 13 has carried out its mission, the flying unit 2 can carry out a mission report, for example by taking an image of the environment of the target using a suitable sensor 4, and:
 by sending it to a remote station 8 in order to display it on the display unit 10A, which allows in particular an operator at this remote station 8 to know immediately if the flying device 13 has indeed carried out its mission; and/or
 by recording it for later reading and processing.

Other strategies for supplemental use of various embodiments can also be considered. In particular, several flying units 2 can be used, in order to form a chain 23 for observing and for guiding to a final objective, with each flying unit 2 as such supplying a point of observation, then a point of passage, as shown in FIG. 5.

To do this, said target processing system 12 comprises a plurality of target marking devices 1. These target marking devices 1 are apt to communicate between them (as shown by the arrows F in FIG. 5), in order to position themselves in space with respect to one another so as to create a guidance chain 23 for at least one autonomous flying device (not shown), that receives signals S successively from the different flying units 2 during a displacement along the guidance chain 23.

The target processing system 12 in accordance with some embodiments can be implemented in different applications.

Figure 6:
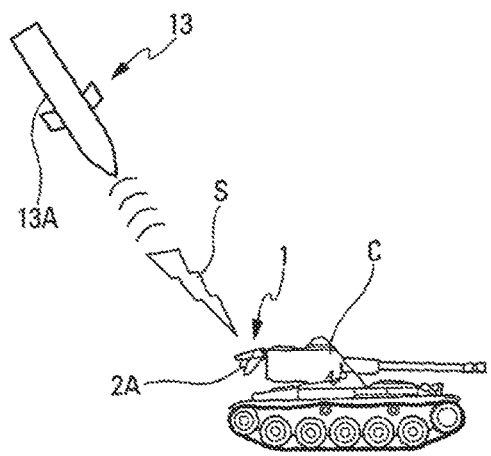
FIGS. 6 and 7 show two possible applications of the target marking device and/or target processing system.

In a particular application, relative to a military context, these embodiments can be used for the guiding of a missile, in particular at low cost. In this application:
 the autonomous flying device 13 is a missile 13A, as shown as an example in FIG. 6; and
 said target marking device 1 comprises a miniaturised aerial unit 2A for marking a target C, for example a building to be neutralised or a vehicle such as a tank as shown in FIG. 6.

More precisely, the target marking device 1 comprises a unit 2A for observing and reconnaissance that will carry out, in particular, the following operations:
 recognising the target C;
 sending the position to the missile 13A; and
 possibly, carrying out a verification of the destruction of the target C (in the case where the guidance is carried out via an emitter 9 placed on the target C, after the moving away of the unit 2A).

Another possible military application (not shown) relates to a demining during a large-scale mission, involving at least one convoy of land vehicles. It is known that mines are a substantial threat for a convoy of land vehicles. They are, in particular, difficult to identify and their explosion reveals to the enemy the location of the convoy. The purpose of the application is to locate the mines upstream of the convoy without exploding them. One or several target marking devices 1 are charged with identifying the mines and placing markers 9 near their position. The markers 9 emit a signal S in order to be easily identified by the convoy.

Moreover, in another application, some embodiments can be implemented during natural catastrophes (earthquake, avalanche, etc.) or accidents (explosions, etc.) for example of industrial origin. It is known that often, during natural catastrophes or certain industrial accidents in particular, rescue teams have great difficulty in identifying the injured, for example in the rubble or under the snow. As one or several injured persons 24 can for example be under rubble 25, as shown very diagrammatically in FIG. 7, it is very difficult to identify the injured 24 by flying over the affected zones at high altitude. Another problem is to sometimes have to take care of a large number of injured persons simultaneously, which requires setting priorities.

Figure 7:
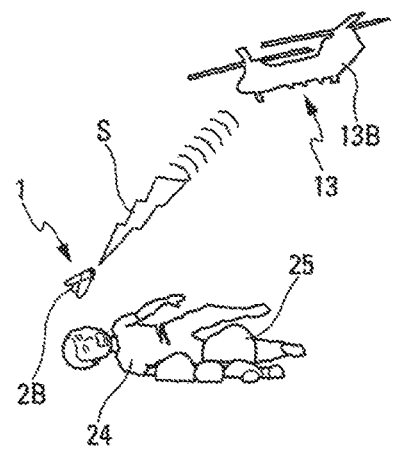

In this framework:
 said target marking device 1 is a device for locating people in distress. More precisely, this device 1 comprises an aerial unit 1B in charge of exploring the zone of the accident or of the catastrophe, to carry out a preliminary diagnosis and to maintain a first contact with the persons 24 located; and
 said autonomous flying device 13 is a rescue vehicle, in particular a rescue aircraft such as an autonomous helicopter 13B which has the capacity to rescue the injured, as shown in FIG. 7.

Some embodiments, such as described hereinabove, have in particular the following advantages:
 it makes the locating, identifying and assigning of a target C more reliable;
 it makes the guidance more reliable by supplying a final objective (target C) and, possibly, much more precise points of passage;

by physically dissociating the acquisition function from the function that processes the target C, it makes it possible to allow more time for the implementing of an observation and acquisition step;

it makes it possible to substantially reduce the cost of the operating chain:

because the expensive acquisition functions are offset in the flying unit 2 which can be reused; and because by approaching much more closely to the target C, the flying unit 2 (for observation and acquisition) can use less expensive sensors 4; and it offers flexibility for use with respect to a vector that physically co-locates all of the various functions required.

While illustrative embodiments have been illustrated and described, it will be appreciated that various changes can be made therein without departing from the spirit and scope of the claimed subject matter.

The invention claimed is:

1. Target marking device, comprising:
 a flying unit configured to be guided with or without aid of guidance orders from a device separate from the flying unit, said flying unit being provided with at least one sensor configured to measure at least one parameter of the environment;
 a data transmission unit configured to emit at least data relating to measurements carried out by the at least one sensor from the flying unit and to receive data relating to said guidance orders at said flying unit, via electromagnetic signals; and
 at least one emitter associated with the flying unit, the at least one emitter configured to emit position information indicative of a marked target to a cooperating vehicle via electromagnetic signals,
 wherein said emitter is detachably fixed on said flying unit, and wherein said emitter is carried by said flying unit and detachable therefrom so as to be positioned on said marked target.

2. Device according to claim 1, wherein the at least one sensor is configured to generate an image of at least one portion of the environment of the flying unit, and wherein said data transmission unit is configured to transmit said image to a display unit of a remote station.

3. Device according to claim 1, wherein the at least one sensor includes one or more sensors selected from the group consisting of:
 a thermal sensor;
 a sensor configured to generate an image of the environment; and
 at least one sensor configured to analyze one of: a chemical parameter, a mechanical parameter, and an electromagnetic parameter.

4. Device according to claim 1, wherein said emitter is fixed on said flying unit.

5. Device as claimed in claim 1, wherein said emitter is configured to emit a directional guidance beam.

6. Device as claimed in claim 1, wherein said flying unit comprises at least one central unit configured to process data including at least data received from said at least one sensor.

7. Device according to claim 6, wherein said at least one central unit is configured to control guidance of the flying unit without aid of said guidance orders.

8. Device as claimed in claim 1, wherein said flying unit comprises a receiving unit configured to receive electromagnetic signals, and a data management unit configured to process electromagnetic signals received by said receiving unit.

9. Device as claimed in claim 1, wherein said flying unit is configured to trigger an explosion of said flying unit.

10. Device as claimed in claim 1, wherein said flying unit has a size less than that of a cube with sides of twenty centimeters.

11. Device as claimed in claim 1, wherein the flying unit is configured to fly at an altitude of 50 meters or less.

12. Device as claimed in claim 1, wherein the cooperating vehicle is selected from a group consisting of an aircraft and a missile.

13. Target processing system, comprising:
 a plurality of target marking devices, each target marking device comprising:
  a flying unit configured to be guided with or without the aid of guidance orders from a device separate from the flying unit, said flying unit including at least one sensor configured to measure at least one parameter of the environment;
  a receiving unit configured to receive electromagnetic signals;
  a data transmission unit configured to emit at least data relating to measurements carried out by the at least one sensor from the flying unit to receive data relating to said guidance orders at said flying unit, via electromagnetic signals, and to process electromagnetic signals received by said receiving unit; and
  at least one emitter associated with the flying unit, the at least one emitter configured to emit position information indicative of a marked target via electromagnetic signals; and
 at least one autonomous flying device comprising:
  means for detecting the position information emitted by the emitter of at least one target marking device of said plurality of target marking devices;
  means for managing said position information for the purpose of guiding the at least one autonomous flying device; and
  means for processing a target,
 wherein said plurality of target marking devices being configured to communicate between one another so as to create a guidance chain for said at least one autonomous flying device.

14. System according to claim 13, wherein:
 at least one target marking device of said plurality of target marking devices is a device for marking a target to be neutralized; and
 said at least one autonomous flying device is a missile.

15. System according to claim 13, wherein:
 at least one target marking device of said plurality of target marking devices is a device for locating at least one person and for marking the position of said least one person; and
 said at least one autonomous flying device is a rescue vehicle.

16. System according to claim 13, wherein the flying unit of at least one target marking device of said plurality of target marking devices is configured to fly at an altitude of 50 meters or less.

17. Target processing system, comprising:
 a first flying unit that includes
  at least one sensor configured to measure at least one parameter of the environment,
  a data communications unit configured to transmit from the first flying unit at least data relating to measurements carried out by the at least one sensor and to receive electromagnetic signals indicative of position information relating to a second flying unit, and
  a first transmitter configured to transmit position information indicative of a first target; and
 an autonomous flying device configured to receive the position information of at least one of the first flying unit and the second flying unit and to control guidance of the autonomous flying device based on said position information.

18. System according to claim 17, further comprising a second transmitter configured to transmit position information indicative of a second target.

19. A target marking device, comprising:
   a flying unit configured to be guided with or without aid of guidance orders from a device separate from the flying unit, said flying unit being provided with at least one sensor configured to measure at least one parameter of the environment;
   a data transmission unit configured to emit at least data relating to measurements carried out by the at least one sensor from the flying unit and to receive data relating to said guidance orders at said flying unit, via electromagnetic signals; and
   at least one emitter associated with the flying unit, the at least one emitter configured to emit position information indicative of a marked target to a cooperating vehicle via electromagnetic signals, wherein said emitter is configured to emit a directional guidance beam.

20. The device according to claim 19, wherein the at least one sensor is configured to generate an image of at least one portion of the environment of the flying unit, and wherein said data transmission unit is configured to transmit said image to a display unit of a remote station.

21. The device according to claim 19, wherein the at least one sensor includes one or more sensors selected from the group consisting of:
   a thermal sensor;
   a sensor configured to generate an image of the environment; and
   at least one sensor configured to analyze one of: a chemical parameter, a mechanical parameter, and an electromagnetic parameter.

22. The device according to claim 19, wherein said emitter is fixed on said flying unit.

23. The device according to claim 19, wherein said emitter is detachably fixed on said flying unit, and wherein said emitter is carried by said flying unit and detachable therefrom so as to be positioned on said marked target.

24. The device according to claim 19, wherein said flying unit comprises at least one central unit configured to process data including at least data received from said at least one sensor.

25. The device according to claim 24, wherein said at least one central unit is configured to control guidance of the flying unit without aid of said guidance orders.

26. The device according to claim 19, wherein said flying unit comprises a receiving unit configured to receive electromagnetic signals, and a data management unit configured to process electromagnetic signals received by said receiving unit.

27. The device according to claim 19, wherein said flying unit is configured to trigger an explosion of said flying unit.

28. The device according to claim 19, wherein said flying unit has a size less than that of a cube with sides of twenty centimeters.

29. The device according to claim 19, wherein the flying unit is configured to fly at an altitude of 50 meters or less.

30. The device according to claim 19, wherein the cooperating vehicle is selected from a group consisting of an aircraft and a missile.

* * * * *